Dec. 15, 1964  W. V. CHUMAKOV  3,161,820
FEED-BACK CONTROL SYSTEM
Filed Aug. 28, 1961  3 Sheets-Sheet 1

INVENTOR.
WALTER V. CHUMAKOV
BY
OSTROLENK, FABER, GERB & SOFFEN
ATTORNEYS

INVENTOR.
WALTER V. CHUMAKOV
BY
OSTROLENK, FABER, GERB & SOFFEN
ATTORNEYS

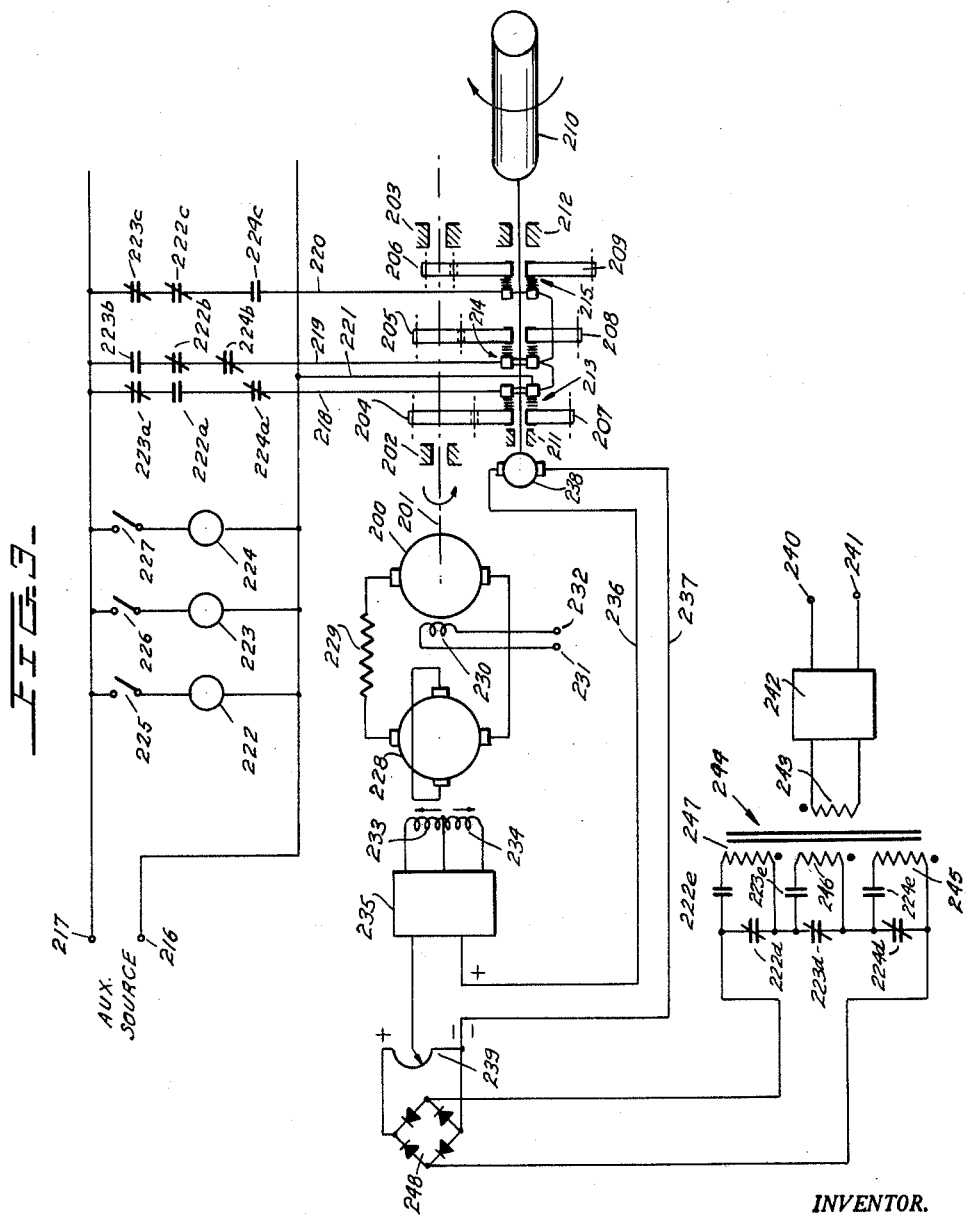

3,161,820
FEED-BACK CONTROL SYSTEM
Walter V. Chumakov, Philadelphia, Pa., assignor to I-T-E Circuit Breaker Company, Philadelphia, Pa., a corporation of Pennsylvania
Filed Aug. 28, 1961, Ser. No. 134,415
18 Claims. (Cl. 323—66)

My invention relates to system wherein a plurality of units may be selectively connected or disconnected to a common output where there is a common regulating means for each of the units, and more specifically relates to a means whereby the switching of any of the units either into or out of the system causes a change in the level of operation of the feed-back system between the common output and the regulator means.

Systems are well known wherein a plurality of individual units are connected to operate a common output device. By way of example, but not by way of limitation, in a rectifier installation for supplying very high power as in electrolytic applications for manufacture of chlorine or aluminum, a plurality of parallel or series connected rectifier units may be provided for the single output D.-C. system. The individual parallel or series connected units are then controllably connected or disconnected from between the A.-C. source and D.-C. line.

Some of the reasons for using individual units in this manner rather than one large unit is that the total requirements of the output may be too great for an economically manufactured single unit; there will be better loading of the controlled system for a given output level; units could be provided with individual phase shifters or similar devices to improve loading of the input system; servicing, repair and replacement of the indivdual units without interrupting the operation of the output system may be accomplished; and there is a possibility of using standby units which may be switched into the system in case of emergency. In general, by using a plurality of individual units, there will be an increase in stability, accuracy, and improvement in the performance of the complete system.

In order to regulate the operation of the individual units of a system, it is common practice to use a single regulator device which is common to each of the units. Thus, in the rectifier illustration given above, a single voltage regulating transformer may be provided in front of a main A.-C. power transformer which is common to each of the individual units.

The output requirements of the output system are set in some manner within a feed-back system, and the output being supplied is measured and is also applied to the feedback system. Depending upon the difference in the requirements which have been set in the system and the particular output, the voltage regulating transformer will adjust the input voltage to each of the rectifier units so that the output requirements are achieved.

Some of the reasons for using the single regulating means rather than a respective regulating means for each individual unit lie in questions of economy, space requirements, the elimination of hunting problems between a large number of regulators in parallel, and in improved reliability because of a less complicated system.

It is presumed that the individual units connected to the common load can be selectively switched into and out of the system, thus requiring that the system response time constant be long compared to the switching time, or changes in output during the transition and switching can be tolerated, or that the units remaining on the line when one is switched out can be temporarily over-loaded during the switching time and until the regulating means assume a new balanced position.

In the prior art, it has been the practice, before the switching operation, to change the output of the individual units through a setting means in the feed-back system which controls the total system output. When the new output at which the remaining units will operate is achieved, the switching operation is performed to take out a unit from the system. Conversely, where an additional unit is to be added to the system, it has been the practice to first add the unit, and thereafter increase the regulator setting to compensate for the presence of the additional unit.

Systems of this type are set forth in copending application Serial No. 745,155 filed June 27, 1958 entitled Shockless Automatic to Manual Changeover System for Regulators in the name of I. K. Dortort, and assigned to the assignee of the present invention. As disclosed in that application, this procedure achieves smooth transition and prevents overloads from being applied to units remaining on the line during the switching operation.

Notwithstanding these advantages, such a system has many disadvantages. The first of the disadvantages is that a certain amount of time is required for changing the setting means which sets the level of operation of the regulator for the condition it is to assume after the switching operation. The necessary transition period may be too long for emergency transfer of units in a large system.

Another and major disadvantage with the prior art techniques is that when a new number of units are connected to the line, the useful regulating range of the setting means will be limited because the full range of the setting means is usually designed for maximum rating of the entire installation. That is to say, the setting means can, for example, be a control rheostat which is designed for control from zero to 100% of the full control range at the maximum output of the system and with all individual units connected in the system. When, because a unit is to be dropped from the system, the operator first decreases the system output by means of this control rheostat, a portion of the useful adjustment range of the setting means is lost, since the new position of the rheostat becomes the new 100% control position. By way of example, when half of all the units on the line are to be removed, the control setting will be lowered to a 50% point providing the units have equal rating, and the half of the units thereafter dropped. The control means such as a rheostat will now only have from zero to 50% of its useful range of adjustment left for control of the remaining units so that a substantial amount of sensitivity is lost.

A further disadvantage with prior art techniques is that manual operation of the setting means has been required so that automatic or remote control of the setting means becomes complex, and in many cases cannot be used.

In a second known group of systems a single regulator device may be provided to control a plurality of units of different characteristics or ratings which are alternately and selectively connected or disconnected from an output device. Again, a rectifier installation may consist of a large rectifier unit furnishing high power output to an electrolytic cell line and a small unit provided with limited output for polarization of the cells. A single voltage regulating transformer may be provided in front of both units. Switching means may be arranged to first connect the polarizing unit to the line, then disconect it when polarization is finished and finally connect the main unit thus starting the electrolytic process. The regulating transformer control may be arranged to maintain a regulated output of one or the other unit in accordance with individual unit rating or process requirements.

As a further example, in a constant speed regulator system a variable speed motor controlled by a regulator may be connected to a load shaft through a set of gears. Pairs of gears may be selectively engaged by means of clutches to obtain desired ranges of load shaft speed and the regulator will be called upon to maintain constant speed within the selected speed range.

Most of comments on the first group of systems apply also to the second group. In many cases, as previously mentioned, it will be desirable to obtain rapid and automatic transfer from one sprescribed operating condition or rating to another whereby setting means retain full adjustability within the selected range of operation.

In accordance with the present invention, when the number of individual units connected to a common output are to be changed by switching in or out of various units, or if individual units are to be alternatively connected or disconnected, I connect the switching means associated with the units to a feed-back system level control means, whereby switching in or out of the unit will cause the level of operation of the feed-back system to be increased or decreased, and the position of the setting means which controls the percentage of rated output from units in the system delivered to the common output is left unchanged. Generally, this level will be proportional to the new output level of the system, although in some cases it may be desirable to somewhat modify the new output level according to new operation requirements.

More important, however, since the regulator setting means has been untouched during the operation, the regulator setting means retains its full range or full scale of control over the new range of operation of the output system.

Finally where the removal or addition of units was required because of operation requirements or some emergency condition, since the switching means of the units is interconnected with means for changing the level of feed-back system operation a new operation level is automatically attained without the need for manual intervention.

Accordingly, a primary object of this invention is to provide a novel automatic transfer scheme for feed-back control systems.

Another object of this invention is to provide a novel feed-back or reference control arrangement for feed-back systems wherein a plurality of individual units can be selectively connected to or disconnected from the common output.

A further object of this invention is to cause the level of operation of a feed-back control system to be modified responsive to the connection or disconnection of individual units feeding a common output means.

A further object of this invention is to provide a novel transition arangement for feed-back control systems which does not require manual alteration of the regulator setting means.

A further object of this invention is to provide a novel transformer scheme for feed-back control systems wherein the setting means is operable throughout its full range regardless of the number of units added or taken away from a common output system, and regardless of their ratings or characteristics.

These and other objects of my invention will become apparent from the following description when taken in connection with the drawings in which:

FIGURE 3 shows a still further embodiment of the invention as applied to a mechanical system for maintaining a constant output speed of a mechanical shaft within selected range and independent of load condition on the shaft.

Figure 1:
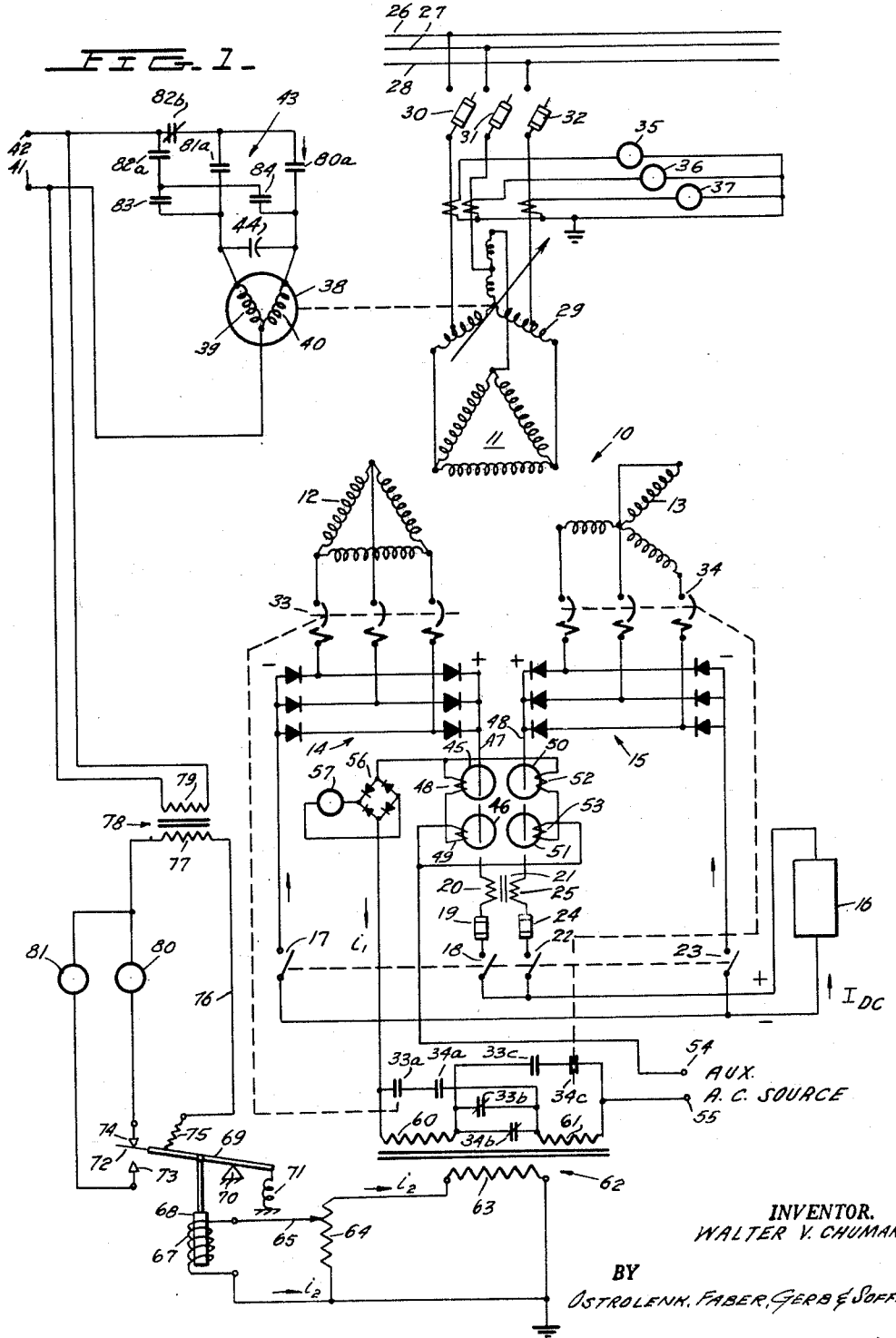
FIGURE 1 shows a first embodiment of the invention as applied to a first and second parallel connected rectifier system which feed a common D.-C. load and are regulated for a constant current output.

Referring now to FIGURE 1, I have illustrated a first embodiment of the invention for the case of two parallel connected rectifier units which can be selectively connected or disconnected individually to a common load with a transfer scheme in accordance with the present invention for permitting such transfer of units, and causing an automatic resetting of the feed-back level which controls the regulator system.

While I have chosen to illustrate the invention in connection with parallel connected rectifier units, it will be apparent to those skilled in the art that the invention is applicable to any type of feed-back control system, whether mechanical, electric, hydraulic or any other type, so long as the properties of feed-back control systems are present.

Moreover, the embodiment of FIGURE 1 will be seen to be regulated to have a constant current output. This particular mode of control is also selected for purposes of illustration, it being noted that any parameter of the system could be controlled.

The system of FIGURE 1 includes a main A.-C. transformer 10 which has a primary winding 11 and two independent secondary windings 12 and 13. Each of secondary windings 12 and 13 drive their own respective full wave bridge-connected rectifier systems 14 and 15 respectively. The rectifier system including transformer secondary 12 and rectifier system 14 is connected to a D.-C. load 16, which can be of any type, through disconnect switching means 17 and 18 respectively where switch 18 is connected in series with a fuse 19 and a winding 20 of an interphase transformer 21. In a similar manner, rectifier system 15 is connected to load 16 through the switching means 2 and 23 where switching means 22 is connected in series with a fuse 24 and winding 25 of interphase transformer 21.

The primary winding 11 of transformer 10 is connected to main A.-C. source of power which includes conductors 26, 27 and 28 through a primary voltage regulating transformer 29 which is connected to the lines 26, 27 and 28 by fused disconnection 30, 31 and 32. A.-C. voltage is thus applied to rectifiers 14 and 15 through the regulating transformer 29 when A.-C. circuit breakers 33 and 34 connected to windings 12 and 13 are closed.

It will be noted that ammeters 35, 36 and 37 or other devices may be connected to each of the primary lines in front of regulating transformer 29 by use of current transformers on the respective lines in the usual manner.

The regulating transformer 29 could be of an induction type which adjusts the primary voltage applied to primary winding 11 by causing a change in the position of its rotor relative to the stator, hence by changing magnetic coupling between regulator magnetic structures. The rotor position is controlled in the usual manner by reversible motor 38 whose direction of rotation is dependent upon the phase relationship of the voltages applied to windings 39 and 40. It will be noted that this particular type of regulating transformer was selected for purposes of illustration. Clearly, however, the regulator could be of any type suitable for the purpose, such as step-type voltage regulating transformer (tap changer under load), regulating reactors or other regulating means well known in the art.

An auxiliary source of power connected to terminals 41 and 42 is connected to motor 38 in the desired phase relationship, dependent upon appropriate contact positions of the contacts in the relay system 43, as will be described more fully hereinafter. A phase splitting capacitor 44 is provided for the motor in the usual manner.

As is usual in all feed-back systems, it is first necessary to provide a means for measuring the total output of the system. Such a measuring means is provided by transductors 45 and 46 which receive bus 47 as a primary winding for rectifier system 14, and have secondary windings 48 and 49 respectively connected in opposing polarity relation.

In a like manner, transductors 50 and 51 are provided for bus 48 of rectifier system 15, and have opposing polarity windings 52 and 53 respectively which are connected in series. Such transductor schemes are well known in the art wherein windings 48 and 49, and windings 52 and 53 are connected in series with a source of A.-C. power which is connected to terminals 54 and 55, and in further series with the A.-C. terminals of rectifier 56. The output D.-C. current of rectifier 56 then flows through a D.-C. ammeter 57 to give a very accurate measure of the D.-C. current in buses 47 and 48.

In accordance with the present invention, the A.-C. current in this metering circuit is further caused to flow through primary windings 60 and 61 of a current transformer 62. The secondary winding 63 of current transformer 62 delivers a feed-back signal for controlling the operation of the regulator system in accordance with the invention. Thus the output signal appearing on winding 63 which is a function of the total current flowing to load 16 is applied across a potentiometer 64 or a variable transformer, as may be the case. The voltage across potentiometer 64, which depends upon position of potentiometer wiper 65 (which is the setting means for controlling the percentage of rated output to be delivered by the units connected in the system), is connected in series with the solenoid winding 67. The solenoid winding 67 receives a magnetic plunger 68 which is pivotally connected to a beam 69 pivoted at pivot point 70. The beam 69 is normally biased in a clockwise direction by biasing spring 71 where the force applied to magnetic plunger 68 by coil 67 normally tends to overcome the force of spring 71 to hold lever 69 in some neutral position.

In the regulator system, it will be understood that spring 71 acts as a fixed reference signal, while potentiometer 64 operates as a setting means for setting the level of operation of the feed-back system. This will be shown more fully hereinafter.

The end of lever 69 is provided with a conductive section 72 which is engageable with either of relatively fixed contacts 73 and 74, depending upon the position of lever 69. Moreover, the right-hand end of lever 69 is electrically connected through a flexible conductor 75 to a conductor 76 which is connected to the right-hand end of secondary winding 77 of a transformer 78. The primary winding 79 of transformer 78 is connected directly across terminals 41 and 42 which, as pointed out previously, is connected to some auxiliary A.-C. source.

Contact 74 is connected directly in series with a relay coil 80, while contact 73 is electrically connected to a relay coil 81, the upper ends of relay coils 80 and 81 being both connected to the left-hand side of winding 77. Accordingly, when the contact portion 72 of lever 69 engages contact 74, relay coil 80 will be energized from winding 77. Similarly, when contact 72 engages contact 73, the relay coil 81 will be energized from winding 77.

Relay coils 80 and 81 operate contacts of the relay arrangement 43 which control the operation of motor 38 which, in turn, controls the regulating transformer 29. More specifically, relay coil 81 is operable to cause operation of normally open contact 81a in the contact arrangement 43, while relay coil 80 is operable to operate normally open contact 80a in the relay arrangement 43.

The relay contacts 80a and 81a are so arranged as to cause operation of motor 38 to respectively increase and decrease the primary voltage delivered by regulator transformer 29. That is to say, when contact 80a is closed because of engagement between contacts 72 and 74, motor 38 will drive regulator transformer 29 in a direction to increase the primary voltage. Conversely, when contact 81a is closed because of engagement between contacts 72 and 73, motor 38 will drive so as to cause regulator transformer 29 to decrease the primary voltage.

In addition to contacts 80a and 81a, manually operable normally open contact means 82a, 82b, 83 and 84 are provided which can manually cause operation of motor 38 in either of its directions.

It is now possible to consider the manner in which such regulating systems have been used in the past in a constant current regulating system. Assuming that both rectifier units 14 and 15 are connected to load 16, the current being delivered is measured by the transductor system to cause a predetermined current to flow in windings 60 and 61, assuming for the present that these windings are connected in parallel. This generates a predetermined current signal in winding 63 to establish a particular current through coil 67 which is dependent upon the setting of potentiometer wiper 65. Assuming that the current supplied by the two rectifiers 14 and 15 is higher than what it should be according to the adjustment of potentiometer wiper 65, winding 67 will generate a signal sufficiently strong to cause lever 69 to rotate counterclockwise against the reference force of spring 71 to cause contacts 72 and 73 to close. This will energize coil 81 so as to close contact 81a and thus energize motor 38 to cause a decrease in the primary voltage applied by regulating transformer 29. This decrease in voltage will cause a decrease in the voltage of secondary windings 12 and 13, and thus a decrease in the output voltage of the rectifier system so that the load current which is to be kept constant by this system is decreased until it reaches the value predetermined by the setting of wiper 65.

Assume now that both units have the same rating and that only one-half the total rated output of the system is required by the output load. This is best achieved by taking off one unit so that the other unit can operate at 100% of its rated output. In the prior art, and when it was now desired to remove, for example, rectifier system 14 from the line and retain only rectifier system 15 as because only half the rated load output will be needed for load 16 (it being more efficient to operate unit 14 at 100% of its output, rather than use both rectifiers 14 and 15 at 50% of their rated output), it was the practice to first change the position of wiper 65 so that the system, while both rectifiers 14 and 15 are on the line, regulated down to the new current level desired in load 16. It will be noted that this takes a certain amount of time. Thereafter, circuit breaker 33 and disconnects 17 and 18 would be opened so that the full current required is transferred to rectifier 15 which regulates up from the 50% output present supplied to its 100% value through the feed-back system.

In this condition, it will be noted that potentiometer wiper 65, which is the setting means for the system, has moved through one-half of its full range and remains at the one-half position. The rectifier 15, which is now operating, for example, at its rated value to supply the one-half output load required by load 16, is now controlled only by the remaining half of the range of control of wiper 65 where a change in percentage of rated output of the single remaining unit is desired. Thus, the full 100% range of control of the setting means is not available in controlling the operation of the single system 15.

In accordance with the present invention, and rather than changing the position of potentiometer wiper or setting means 65 when one of the units in the system is to be removed, I provide a novel change in the level of operation of the feed-back system. More specifically, and as shown in FIGURE 1, this feed-back system level change can be accomplished within the current transformer 62, and can be accomplished responsive to the operation of the switching means, such as circuit breakers 33 and 34 which control the connection or disconnection of the respective units.

The windings 60 and 61 are seen to be interconnected through a plurality of contacts. Each of the contacts in this arrangement are interlocked in any desired manner with the operation of circuit breakers 33 and 34. This has not been indicated for each of the contacts, since it would unduly complicate the drawing. However, the circuit breaker 33 is interlocked with normaly open contact 33a, normally closed contact 33b, and normally open contact 33c. In a similar manner circuit breaker 34 is interlocked with normally open contact 34a, normally closed contact 34b and normally open contact 34c.

When both circuit breakers 33 and 34 are closed so that both units are connected to load 16, the contacts 33b and 34b are open, while the remaining contacts are closed, whereby windings 60 and 61 are connected in parallel with one another.

Assuming that the ratings of rectifier units 14 and 15 are equal to one another, the number of turns of windings 60 and 61 will also be equal to one another.

With the windings in parallel with one another, the secondary current in winding 63 is equal to the ratio of the number of turns of one winding 60 or 61 to the number of turns of winding 63 times total primary current $i_1$ in the transformer. Assuming for purposes of illustration that each of windings 61, 62 and 63 have the same number of turns, the secondary current $i_2$ will be equal to the primary current $i_1$. If now one of the units such as unit 14 were removed from the line as by opening circuit breaker 33, this would cause an automatic opening of contacts 33a and 33c, and an automatic closing of contact 33b. The new contact arrangement is such that windings 60 and 61 will be in series, whereby a new turns ratio is established for the transformer which will be a two-to-one ratio so that the current $i_1$ will now be one-half of the current $i_2$ when regulating system reaches a balanced condition. It will be noted that opening of circuit breaker 34 rather than circuit breaker 33 will cause the same series connection between windings 60 and 61.

By causing this new turns ratio, it will be seen that the level of the feed-back current $i_2$ is tentatively and automatically changed in proportion to the number of units on the line upon operation of respective switching means until the regulator automatically operates and adjusts the primary voltage 29 to a new level which corresponds to a new capacity of the system. By way of example, let us assume that both units 14 and 15 have equal ratings and were connected to load 16 prior to removal of unit 14 from the line. Assuming that each of windings 61, 62 and 63 have the same number of turns, the secondary current $i_2$ will be equal to the primary current $i_1$ which in turn is proportional to total load current $I_{dc}$ through load 16, the current $I_{dc}$ being the total rated current of units 14 and 15. Let us further assume, the force due to current $i_2$ was balanced against the force of the spring 71 and beam 69 was in floating position with contacts 72–73 and 72–74 being open. If now unit 14 is removed from the line as by opening circuit breaker 33, the remaining unit 15 will take over nearly all of the previously furnished current $I_{dc}$. Hence, unit 15 will be overloaded until the regulating transformer 29 has time to operate. With the assumption that the rectifier inherent regulating characteristic slopes are the same for both conditions one could say that the current $I_{dc}$ and hence the current $i_1$ remain substantially constant immediately after opening of the breaker 33 and equal to their values when both units were operating. The breaker 33, however, modified the turns ratio of the current transformer 62 by means of auxiliary contacts 33a, 33b and 33c from one-to-one to two-to-one. Therefore, during the unbalance period the current $i_2$ is now twice its previous value. Hence, contacts 72 and 73 will close due to a corresponding increase in the magnetic pull of the solenoid 67 and operate regulating transformer 29 in the previously described manner thus decreasing the A.-C. voltage to the rectifier 15.

This will result in a proportional decrease of the output current $I_{dc}$ until the rated output of unit 15 is reached. At this level, the current $I_{dc}$ and hence $i_1$ are one half of their values prior to removal of unit 14 from the line.

Since the new turns ratio of the transformer 62 is now 2:1, the current $i_2$ (feed-back signal) is equal to its original value so that beam 62 returns to its balanced position, contacts 72–73 open and the regulating transformer motor 38 stops. Thus, the switching of the transformer 62 windings causes the regulating system to readjust the output current $I_{dc}$ to a new level corresponding to a new rated output capacity of the installation.

In general terms, by using automatic switching means and the variable ratio transformer, I have changed the gain of the feed-back loop according to available installation output capacity so that at the new operating level the feed-back signal being compared with the reference signal is essentially the same as it was prior to the switching operation.

The aforementioned gain of the feed-back loop is hereby defined as a ratio of the controlled variable (rectifier unit output) to the feed-back signal in the error measuring means (comparator).

It will be noted that the transfer from one level of operation to another was accomplished automatically and with minimum transition time.

Furthermore, in accordance with the invention, this change-over has been made without affecting the setting of wiper 65 which is the setting means of the system. Thus, the full range of control of wiper 65 is available for operation of the single remaining unit 15, as contrasted to the previous practice where a substantial portion of this range of control was lost. Moreover, in assuming the change-over was necessary because of an emergency condition, the mere operation of the circuit breaker 33 under the emergency condition which could, for example, be a fault within the unit, has caused the immediate change-over of the feed-back loop gain of the system so that the single remaining unit 15 is now loaded in accordance with its capacity with its percent loading being determined by original setting of potentiometer 64.

It will be noted from the foregoing that the regulator system of FIGURE 1 is for constant current regulation. Clearly, however, the system could be modified so that any parameter is controlled, such as a constant voltage, and it is believed further to be obvious that the system could be applicable to regulator systems other than electrical types of systems as described.

Where more than two rectifiers are connected in parallel, the current transformer switching arrangement of FIGURE 1 can become somewhat complex, and the problem may be further complicated because of no particular fixed sequence of loading of units, or of taking them off the line. However, the system of FIGURE 1 is ideally applicable to the case of two parallel connected units.

Figure 2:
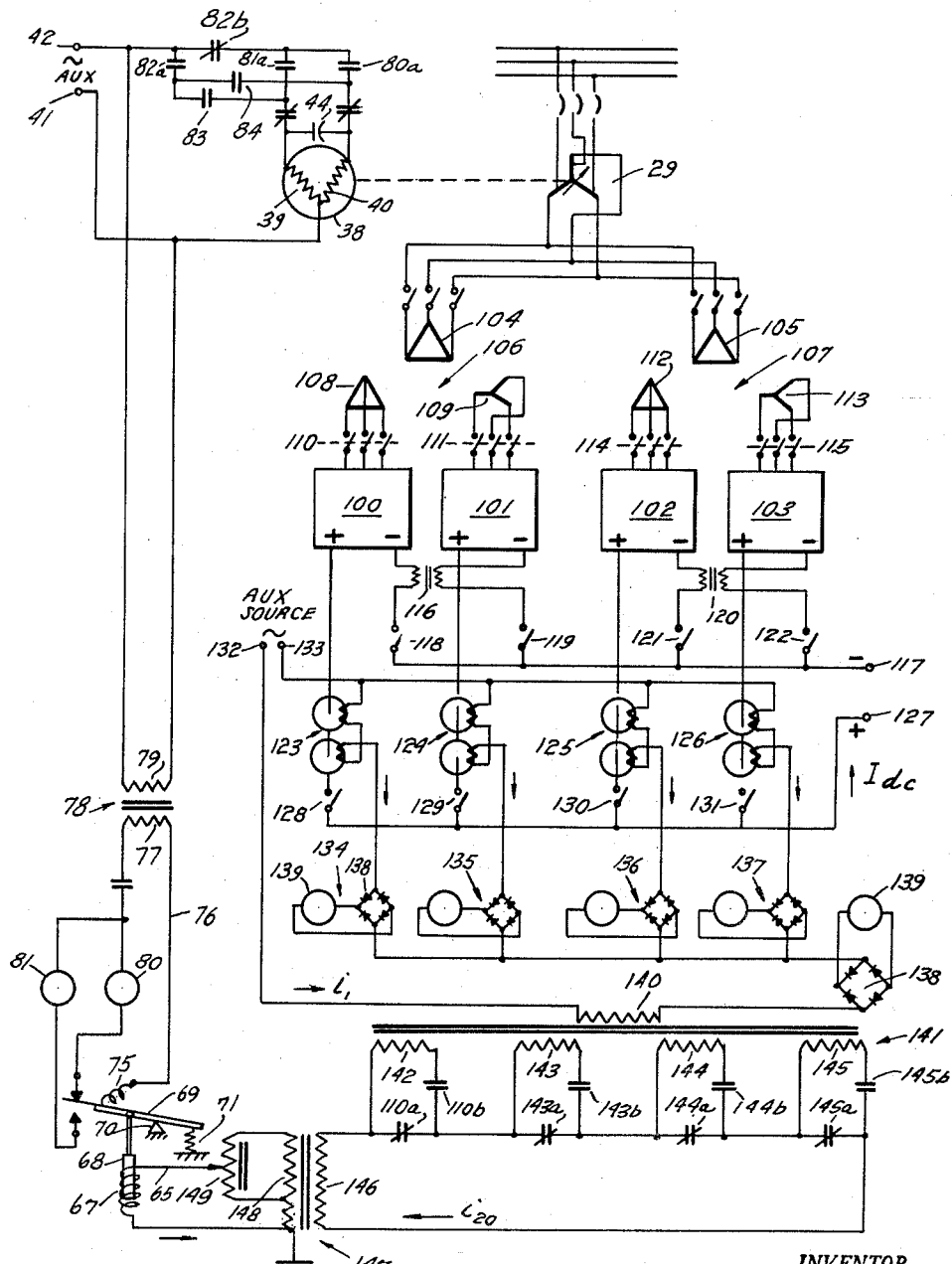
FIGURE 2 shows a second embodiment of the invention for the case of four parallel connected rectifiers which feed a common load and are regulated for a constant current output.

It should be noted, that the arrangement of transformer 62 of FIGURE 1 can only be used if units 14 and 15 have equal current rating, since windings 60 and 61 in this specific example must have an equal number of turns. Otherwise circulating current will exist in the transformer when windings 61 and 62 are connected in parallel.

Where more than two units are used or where units are of different rating or characteristic, the concept of the present invention can be applied as illustrated in FIGURE 2.

Referring to FIGURE 2, those components similar to components described in FIGURE 1 have been given a like identifying numeral. The system differs from FIGURE 1 in that a plurality of rectifier units 100, 101, 102 and 103 are used rather than the two units 14 and 15 of FIGURE 1.

In FIGURE 2, the regulating transformer 29 is connected to primary windings 104 and 105 of independent A.-C. transformers 106 and 107 respectively. Each of transformers 106 and 107 is similar to transformer 10 of FIGURE 1 whereby the system of FIGURE 2 merely duplicates the system of FIGURE 1 for the case of two parallel connected systems of rectifiers. Thus, secondary windings 108 and 109 are connected to rectifiers 100 and 101 respectively through circuit breakers 110 and 111 respectively, while secondary windings 112 and 113 are connected to rectifiers 102 and 103 respectively through circuit breakers 114 and 115 respectively.

The negative output terminals of rectifiers 100 and 101 are combined in an interphase transformer 116, and are connected to the negative output terminal 117 of the system through disconnect switches or breakers 118 and 119 respectively. In a similar manner, the negative output terminals of rectifiers 102 and 103 are combined in interphase transformer 120, and are connected to terminal 117 through disconnects or breakers 121 and 122 respectively.

The positive output bus of each of rectifiers 100 through 103 are connected to appropriate transducer core systems 123, 124, 125 and 126 respectively. Each of the positive buses are then connected to a common positive output bus having a terminal 127, and are taken through disconnect switches or breakers 128, 129, 130 and 131 respectively.

The transductor schemes for measuring the D.-C. output current of each unit are connected in parallel with one another with respect to a common A.-C. source which is connected to terminals 132 and 133. Individual transductor metering systems 134, 135, 136 and 137 are then provided for each of transductors 123 through 126 respectively so that a measure of the current of any of rectifier units 100 and 103 is available. That is to say, each of systems 134 through 137 will, as shown for system 134, include a rectifier element 138 and ammeter 139 connected to the D.-C. output of the rectifier.

A main or totalizing metering arrangement is then provided by rectifier 138 and meter 139 where rectifier 138 is connected in series with the parallel connected groups of transductor systems 123 through 126 and primary winding 140 of current transformer 141. The current flowing through winding 140 and rectifier 138 will, of course, be a function of the total output current at terminals 117 and 127 which are connected to some D.-C. load.

The current transformer 141 is then provided with secondary windings 142 through 145 which correspond to rectifiers 100 through 103 respectively. Each of windings 142 and 145 are selectively connected in series with one another, as will be described hereinafter, and in series with the primary winding 146 of an auxiliary current transformer 147. The output winding 148 of auxiliary current transformer 147 is identical in function with winding 63 of FIGURE 1. Note that in FIGURE 2, however, instead of using a potentiometer 64 as the setting means of the system, an adjustable auto transformer 149 is utilized.

In order to adjust the feed-back loop gain or ratio in accordance with the number of rectifier units connected in the line, each of circuit breakers 110 through 115 are interlocked with contacts associated with secondary windings 142 through 145 respectively of current transformer 141. Thus, circuit breaker 110 is associated with normally closed contact 110a and normally open contact 110b where contact 110a is closed when circuit breaker 110 is open, while contact 110b closes when circuit breaker 110 closes. In a similar manner, normally closed contacts 143a, 144a and 145a are associated with circuit breakers 111, 114 and 115 respectively, while normally open contacts 143b, 144b and 145b are similarly associated with circuit breakers 111 and 114 and 115.

Accordingly, when the associated circuit breaker is in the open position, its respective current transformer winding will be removed from the series connected transformer windings. That is to say, if circuit breakers 111, 114 and 115 are closed, contacts 143a, 144a and 145a will open, and contacts 143b, 144b and 145b will close so that windings 143, 144 and 145 are connected in series. However, contact 110a will be closed so that the series connected windings are connected directly in series with winding 146 and by-pass the winding 142.

Assuming now that rectifier units 100 through 103 have equal ratings and windings 140 and 142 through 145 all have the same number of turns, it will be apparent that when all four rectifier units 100 through 103 are in operation, the current through winding 140 will be four times the current $i_{20}$. If one of the units 100 through 103 is removed, the feed-back level established by the current through winding 140 changes to three times the current in winding 146 and similarly, if only one of the rectifiers were in operation, the current through winding 140 would be the same as the current in winding 146 at balanced or stabilized conditions in the regulating system. Thus, the ratio of the controlled variable (rectifier unit output) to the feed-back signal in the comparator and hence, overall gain of the feedback elements is changed responsive to switching of various of the units into and out of the system, without requiring a change in the setting means 149 in the system, whereby the full range of control of the setting means is available, even though some units are taken off of the line.

While in FIGURES 1 and 2 I have shown the use of a signal form D.-C. metering transductors, it will be apparent that in the electrical application of the invention, other methods of measuring output or controlled variable and of deriving the feed-back signal are possible. By way of example, current transformers in the A.-C. line could be readily used.

It is noted that in the arrangement of FIGURE 2, some precautionary measures might be taken to prevent voltage build-up across the current transformer during current transformer switching, when all of the tansformer load windings ae disconnected from the load, or when the current circuit is interrupted. In a transductor circuit the maximum voltage which could appear at the current transformer is equal to the voltage of the auxiliary source connected to terminals 132 and 133 with superimposed system and commutation transients. Thus, the transformer insulation should be sufficient for this purpose.

In a circuit having the current transformers in the A.-C. line of the rectifiers, however, the current path may not be interrupted. It is, however, possible to make the switching contacts of the overlapping type so that there is constantly a circuit across the transformer winding. Moreover, additional commonly used short circuiting means or by-pass resistors or windings could be used to overcome the problem.

While in the above systems current measuring means have been used, it will be obvious to those skilled in the art that the current transformer arrangemtnt could be replaced by potential transformer arrangements where, for example, voltages developed across a shunt in series with the individual rectifier buses is used for the feed-back signal. If output is direct current or voltage such signals should, of course, be first converted into A.-C. signals in order to use the transformer switching scheme. It will be understood that the term "units" as used in this specification applies to but is not limited to a group of devices performing similar functions. Such units could be rectifiers, banks of transformers, amplifiers, rotating electrical machinery, gear sets in a transmission or similar devices. The units may be connected or separate in series, parallel or series parallel and can be individually and alternatively placed on the line.

The best location of the disclosed auxiliary switching means and the variable ratio current or potential transformer arrangement in the system will depend on particular applications.

By way of example, if desired, instead of using relay 67 in FIGURE 2 one could introduce an appropriate amplifier operated by an error signal from an error measuring device which compares the feed-back signal proportional to current $i_1$ with a standard electrical signal. Setting means could be used in the reference signal circuit and a potential transformer with variable ratio similar to one which will be later described in FIGURE 3 may be employed to modify the reference signal level in accordance with number of units on the line. In this case the amplifier would be connected to operate relays 80 and 81 and, hence, the regulator 29.

Furthermore, if amplifiers are used within reference circuits or feed-back loops the disclosed switching or automatic change in the operational level could be accomplished within said amplifier circuits to change their gain or output.

In FIGURES 1 and 2, the regulation system described has been of the type where the primary voltage applied to the system is regulated to maintain a constant output current. Other regulating systems could, of course, be used such as in the use of regulating reactors connected in series with each of the rectifier phases. Such regulating systems are shown, for example, in U.S. Patent No. 2,817,805 (C-282), in the name of E. J. Diebold entitled Flux Reversal Circuit for Commutating Reactors of Mechanical Rectifiers and assigned to the assignee of the present invention. In devices of this type, the output voltage of the rectifiers is controlled in accordance with the biasing signal applied to a saturable type reactor in series with each rectifier phase.

In accordance with the present invention, this biasing signal could be controlled in accordance with the principles set forth herein where it is controlled in accordance with a comparison of a reference signal and a feed-back signal. The feed-back signal magnitude or the comparison signal magnitude can then be adjustably controlled as in FIGURES 1 and 2 where the entire feed-back loop gain or ratio of output to feed-back signal is altered or as in FIGURE 3, which will be discussed hereinafter, where the reference signal applied to the comparator is altered. Such adjustable and automatic control could depend upon the number of units selected to carry a common load at given rating of the units or could depend upon size or type of the unit connected to the line or any other specific characteristic of the unit.

FIGURES 1 and 2 have shown the manner in which the invention is applicable to electrical systems, and further show a very specific, yet very desirable, manner in which feed-back circuit ratio or gain can be controlled through the novel current transformer scheme.

FIGURE 3 illustrates the manner in which the invention is applicable to a constant speed regulator system where the specific novel potential transformer is used to control reference signal applied to setting means in accordance with output requirements. The system of FIGURE 3 illustrates the wide applicability of the invention to any type of regulating system.

In FIGURE 3, a motor 200 has an output shaft 201 schematically shown as carried in bearings 202 and 203. Shaft 201 is connected to gears 204, 205 and 206 which are selectively connected to gears 207, 208 and 209 respectively which are connected to the schematically illustrated common output shaft 210 which is carried in bearings 211 and 212. By appropriately selecting the pair of gears to be connected between shaft 210 and motor 200, a particular speed of rotation of shaft 210 is achieved.

The gears 207, 208 and 209 are controllably connected to their respective meshing gears 204, 205 and 206 under the influence of schematically illustrated electromagnetic clutches 213, 214 and 215 respectively. Examples of such clutches are well known to those skilled in the art.

Generally, however, clutches 213, 214 and 215 have windings which, when energized, compact a plurality of interleaved magnetic laminations which are alternately connected to the output shaft 210 and their respective gear. Only one of the windings will be energized at any one time from a D.-C. source connected to terminals 216 and 217, and thence through conductors 218, 219 and 220 respectively, and back through a common return lead 221. The switching arrangement in series with each of conductors 218, 219 and 220 will control which of the electromagnetic clutches is energized.

The energizing circuit includes relay coils 222, 223 and 224 for clutches 213, 214 and 215 respectively which are connected in series with control switches 225, 226 and 227 and are across terminals 216 and 217. Relays 222, 223 and 224 each are provided with three contacts, one in each of lines 218, 219 and 220. Thus, relay coil 222 is associated with normally open contact 222a and normally closed contacts 222b and 222c. Relay coil 223 is associated with normally closed contact 223a, normally open 223b and normally closed contact 223c. Finally, relay coil 224 is associated with normally closed contacts 224a and 224b and normally open contact 224c.

Assuming now that control switch 225 is closed, coil 222 will be energized so that normally open contact 222a is closed. Since coils 223 and 224 are deenergized, contacts 223a and 224a are closed, whereby the closure of contact 222a completes a circuit to the energizing winding of clutch 213 so that gears 204 and 207 connect shaft 210 to motor 200. It will be noted that the remaining conductors 219 and 220 are open, since contacts 223b and 224c are open.

In a similar manner, closure of contact 226 will cause energization of clutch 214, while closure of contact 227 will cause energization of clutch 215.

It is now desired to maintain a constant output speed for shaft 210, depending upon the speed level selected by the particular gear ratio. For this purpose, the output speed of motor 200 is controlled within a given range through the use of a regulator system which includes an amplidyne 228 of the usual type which supplies the armature current of motor 200. The lumped impedance of the system is shown as impedance 229, and the field winding of motor 200 is illustrated as field winding 230 which has terminals 231 and 232 connectable to an appropriate constant field supply.

The input to amplidyne 228 includes the amplidyne control field windings 233 and 234 which are energized from the output of an amplifier 235. The input signal to the amplifier 235 is controlled in accordance with the comparison of a feed-back signal taken over conductors 236 and 237 which are connected to a tachometer 238 and a reference signal generated in a potentiometer 239.

In the case of FIGURE 3, the adjustment of the level of the signal applied to the regulator, including amplifier 235, takes place in the reference circuit as contrasted to the output measuring circuit, as in FIGURES 1 and 2, although the advantage of not disturbing the setting of the setting means comprised of rheostat 239 for adjusting the level of operation of the system remains. That is, only the level of operation of the feed-back system is changed.

In the reference circuit, and to obtain this change in operational level, an auxiliary source of A.-C. power is connected to terminals 240 and 241. This A.-C. source is connected through a constant voltage device 242 of any desired type which generates a constant voltage across the primary winding 243 of a potential transformer 244.

An output voltage is thus developed in secondary windings 245, 246 and 247 of transformer 244, and these voltages are selectively connected to a rectifier 248, as will be described to generate the reference voltage on potentiometer 239.

The novel switching arrangement for altering the level of the reference signal includes normally closed contacts 222d, 223d and 224d which are operated from relay coils 222, 223 and 224 respectively, and normally open contacts 222e, 223e and 224e which, again, are respectively operated from relay coils 222, 223 and 224 respectively. Thus, so long as none of coils 222 through 224 are energized, no potential will be applied to rectifier 248 since contacts 222e, 223e and 224e are open. When, however, one of control switches 225, 226 or 227 is closed, an appropriate switching will occur to appropriately connect one of windings 245, 246 or 247 to the rectifier 248 to set up a reference potential level which is preselected for the particular speed of rotation of shaft 210 selected by the particular gear ratio used.

By way of example, and where shaft 210 is to be rotated at its highest speed, contact 225 will close to energize clutch 213 and connect the highest gear ratio in the system of gears 204 and 207 between motor 200 and shaft 210. The closing of switch 225, since it energizes coil 222, will cause contact 222d to open and contact 222e to close, whereby secondary winding 247 is connected to rectifier 248. Thus, the D.-C. voltage set up across potentiometer 239 is dependent upon the turns ratio of windings 243 and 247 so that, for example, an increased voltage may be generated in potentiometer 239 to compensate for the increased feed-back signal from tachometer 238.

Within this given speed range, the regulator system will operate to maintain a relatively constant speed, since when shaft 210 deviates from the predetermined speed, determined by the specific setting of potentiometer 239, there will be an excessive unbalance between the reference signal and the feed-back signal, and the system will tend to bring this higher signal back to some predetermined value.

If now it is necessary to go to a new gear ratio for setting a new speed level for shaft 210, the prior art requires that this new speed level be achieved in potentiometer 239 before or after switching, whereby a large range of control of the potentiometer is lost. In accordance with the present invention, however, when a lower speed such as that obtained from gears 206 and 209 is to be used, the potentiometer setting of potentiometer 239 is not affected, but the closing of contact 227 removes winding 247 from the reference circuit and connects winding 245 into the reference circuit. The winding 245 may then have an appropriate output voltage so that a new reference signal level is achieved without affecting the setting of potentiometer 239.

Furthermore, the system of FIGURE 3 allows one to use a variable speed motor, an amplidyne or an amplifier with a narrow rated range of control for a wide range of load shaft speeds. Hence, these devices could be made smaller or simpler yet provide desired range, accuracy and response of the load output regulation.

It will be noted that the transformer arrangement of FIGURES 2 and 3 can be used with a plurality of units which have different ratings or characteristics. Thus, each of the windings 142 through 145 of FIGURE 2 or each of the windings 245 through 247 of FIGURE 3 could be provided with a different number of turns in accordance with the ratio of the ratings of unit 110 to unit 111 etc. or with the relationship of the gear ratio 204–207 to that of gears 205–208 etc. That is to say, the number of turns of a transformer winding could be selected to correspond to the rating or characteristic of the unit associated with this winding. It is clear, however, that in case of parallel or series connected units additional means known in the art should be provided to assure proper division of output among such units in accordance with unit ratings or characteristics when the units are connected to a common load.

The embodiment of FIGURE 3 illustrates the general application of the invention wherein an adjustment of range of output of the system is achieved not by the normal control device, but is achieved by a change in the operational level of the system. For example, in FIGURES 1 and 2, the change in operational level took place due to change in the feed-back signal circuit elements or their gain without affecting the setting means. In a like manner, in the embodiment of FIGURE 3, the change is made in the level of the reference circuit, and specifically in the magnitude of the reference signal applied to the comparator, but again the position of the setting means is unaffected. Thus, the setting means retains its full range of control even though a new operational level has been selected. Moreover, this new operational level is automatically accomplished with the changing of the units connected to the common output system.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

I claim:

1. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system.

2. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator control means being operable over its full range independently of the level of operation selected by said regulator level control means.

3. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator level control means being interposed between the said connection between said output system and said regulator means.

4. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output systems; said regulator level control means being interposed between the said connection between said output system and said regulator means and changing the amount of feed-back derived from said output system.

5. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when the other of said first and second devices are connected to said output system.

6. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system.

7. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system and said device characteristics; said regulator control means being operable over its whole range idependently of the level of operation selected by said regulator level control means.

8. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; and regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system and said device characteristics; said regulator level control means being interposed between said connection between said output system and said regulator means.

9. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system and said device characteristics; said regulator level control means being interposed between said connection between said output system and said regulator means and changing the amount of feed-back derived from said output system.

10. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system; said regulator having a standard signal source connected thereto for comparison to the signal taken from said output system; said regulator level control means being interposed between said standard signal source and said regulator.

11. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator level control means including a current transformer means having an adjustable turns ratio; said turns ratio being dependent upon the position of said first and second switching means and altering said level of operation of said regulator between said first and second levels.

12. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator level control means including a current transformer means having an adjustable turns ratio; said turns ratio being dependent upon the position of said first and second switching means and altering said level of operation of said regulator between said first and second levels; said regulator control means being operable over its full range independently of the level of operation selected by said regulator level control means.

13. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator level control means including a current transformer means having an adjustable turns ratio; said turns ratio being dependent upon the position of said first and second switching means and altering said level of operation of said regulator between said first and second levels; said current transformer having a first primary winding and a first and second secondary winding; said first and second secondary windings having contacting means for disabling said first and second secondary windings respectively; said contacting means for said first and second secondary windings being operatively connected to said first and second switching means respectively.

14. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system and said device characteristics; said regulator level control means including a current transformer having an adjustable turns ratio dependent upon the number of said plurality of devices connected to said common output system.

15. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system; said regulator level control means including a current transformer having an adjustable turns ratio dependent upon the number of said plurality of devices connected to said common output system; said current transformer having a secondary winding portion comprised of a plurality of individual windings; a contacting means for each of said plurality of current transformer windings for rendering said windings inoperative; said contacting means for each of said plurality of windings being operatively connected to a respective switching means of said plurality of devices.

16. A feed-back control system; said feed-back control system comprising a plurality of devices operable to drive a common output system, a switching means for each of said plurality of devices for selectively connecting and disconnecting each of said plurality of devices to said common output system independently of one another, a regulator means connected to each of said plurality of devices and to said common output system for adjusting output of each of said plurality of devices in accordance with a predetermined parameter of said output system, a regulator control means for controlling the level of operation of said plurality of devices from said regulator, and a regulator level control means; said regulator level control means being operable to change the level of operation of said regulator independently of said regulator control means between a plurality of discrete levels; said regulator level control means being operatively connected to each of said switching means of said plurality of devices; said regulator level control means changing the level of operation of said regulator to one of said plurality of discrete levels in accordance with the number of devices connected to said output system and said device characteristics; said regulator level control means including a current transformer having an adjustable turns ratio dependent upon the number of said plurality of devices connected to said common output system; said current transformer having a secondary winding portion comprised of a plurality of individual windings; a contacting means for each of said plurality of current transformer windings for rendering said windings inoperative; said contacting means for each of said plurality of windings being operatively connected to a respective switching means of said plurality of devices; said regulator control means being operable over its full range independently of the level of operation selected by said regulator level control means.

17. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator level control means including a current transformer means having an adjustable turns ratio; said turns ratio being dependent upon the position of said first and second switching means and altering said level of operation of said regulator between said first and second levels; said current transformer having one of its said windings connected to said common output system and the other of its said windings connected to said regulator.

18. A feed-back control system; said feed-back control system comprising a first and second device operable to drive a common output system, a first and second switching means for said first and second device for selectively connecting and disconnecting said first and second device to said common output system, a regulator means connected to said first and second devices and said output system for adjusting the output of said first and second devices in accordance with a predetermined parameter of said output system, a regulator control means for controlling the level of operation of said first and second devices, and a regulator level control means; said regulator level control means being operable to change said level of operation of said regulator independently of said regulator control means from a first level to a second level; said regulator level control means being operatively connected to said first and second switching means; said regulator level control means changing said level of operation of said regulator to said first level when only one of said first and second devices are connected to said output system, and to said second level when both of said first and second devices are connected to said output system; said regulator level control means including a current transformer means having an adjustable turns ratio; said turns ratio being dependent upon the position of said first and second switching means and altering said level of operation of said regulator between said first and second levels; said regulator control means being operable over its full range independently of the level of operation selected by said regulator level control means; said current transformer having one of its said windings connected to said common output system and the other of its said windings connected to said regulator.

References Cited by the Examiner
UNITED STATES PATENTS
2,333,617   11/43   Smith _____ 323—66

RALPH D. BLAKESLEE, *Acting Primary Examiner.*
LLOYD McCOLLUM, *Examiner.*